Figure 1:
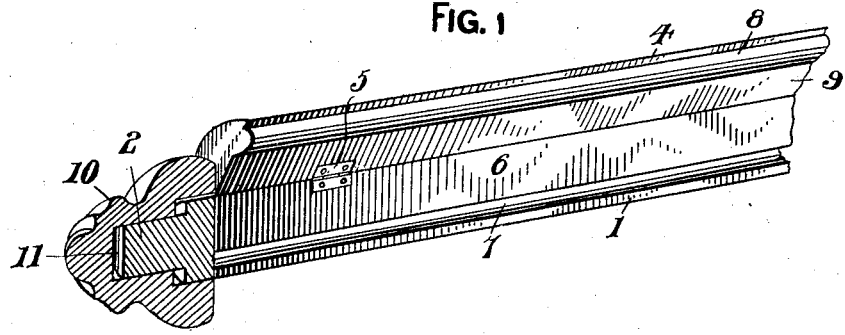

J. SLOWIK.
CURTAIN POLE.
APPLICATION FILED DEC. 4, 1911.

1,055,090.

Patented Mar. 4, 1913.

WITNESSES

INVENTOR
J. Slowik
BY
ATTORNEYS

UNITED STATES PATENT OFFICE.

JOSEF SLOWIK, OF CHICAGO, ILLINOIS.

CURTAIN-POLE.

1,055,090.  Specification of Letters Patent.  Patented Mar. 4, 1913.

Application filed December 4, 1911. Serial No. 663,659.

*To all whom it may concern:*

Be it known that I, JOSEF SLOWIK, a subject of the Emperor of Austria-Hungary, residing at Chicago, in the county of Cook and State of Illinois, have invented certain new and useful Improvements in Curtain-Poles, of which the following is a specification, reference being had therein to the accompanying drawing.

This invention relates to a curtain pole, and my invention aims to provide a sectional pole for holding the upper edges or ends of a curtain, without injury to the same and without resorting to the use of rings or pins, the sections of the pole being hinged together and retained in a closed position by the caps or ornamentations arranged upon the ends of the sections.

The invention further aims to accomplish the above objects by a mechanical construction that is simple, durable and highly efficient for the purposes for which it is intended.

The invention will be hereinafter specifically described and then claimed, and reference will now be had to the drawing, wherein:—

Figure 2:
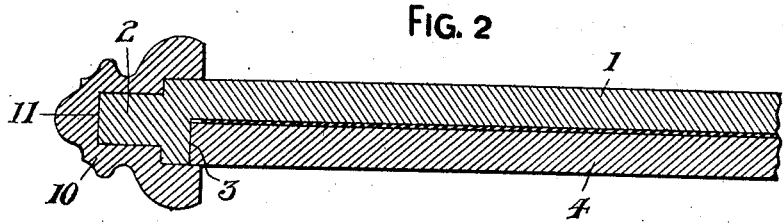
Figure 3:
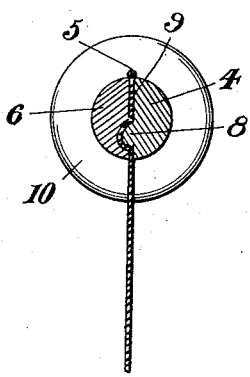

Figure 1 is a perspective view of a portion of a pole in accordance with this invention, showing the sections thereof open and the caps or ornamentations in section, Fig. 2 is a longitudinal sectional view of a portion of the pole, showing the sections in a closed position, and Fig. 3 is a cross sectional view of the same.

A pole in accordance with this invention comprises a cylindrical rod 1 having the ends thereof reduced, as at 2 to provide stems. The front side of the rod 1 is cut away, as at 3 approximately the entire length of the rod, the cut away portion of said rod representing a semi-cylindrical section 4, that is hinged or otherwise connected, as at 5 to the rod 1, whereby the section 4 can be opened relatively to the rod 1. The flat face 6 of the rod 1 is provided with a longitudinal groove 7, adjacent to the lower edge thereof, said groove extending the entire length of the cut away portion of said rod. The groove 7 is adapted to receive a longitudinal rib or bead 8 carried by the flat face 9 of the section 4.

Slidably mounted upon the reduced ends or stems 2 of the rod 1 are caps or ornamentations 10 having recesses 11 to receive the reduced ends of the rod. The inner ends of the recesses 11 are enlarged to receive the ends of the rod 1 and the hinged section 4, whereby when said caps or ornamentations are shifted inwardly, said caps or ornamentations will retain the hinged section 4 in a closed position, as best shown in Fig. 2. By shifting the caps or ornamentations outwardly, the hinged section 4 is released and can be opened as shown in Fig. 1.

The pole in its entirety can be made of light and durable metal, of various sizes, and finished to present a neat and attractive appearance in connection with a window, door or alcove frame.

What I claim is:—

A curtain pole comprising a rod formed of two sections, one of said sections of greater length than the other and formed with cylindrical ends having reduced extensions, said section of greater length between its cylindrical ends being semi-cylindrical in cross section, said shorter section being semi-cylindrical in cross section throughout and positioned between the ends of the elongated section, means for hinging the top of said shorter section to the top of said elongated section, said shorter section having its inner face in close proximity to its lower edge formed with a longitudinal bead of the same length as the length of the section, said elongated section having the inner face of its cylindrical portion in close proximity to its lower edge formed with a longitudinally extending groove for the reception of said bead, a cap mounted upon said cylindrical ends and projecting upon the ends of the shorter section for coupling the sections together, said cap receiving said extensions and abutting against said cylindrical end.

In testimony whereof I affix my signature in the presence of two witnesses.

JOSEF SLOWIK.

Witnesses:
 HENRY JAMES LYNCH,
 JOSEF TENEROWICZ.

Copies of this patent may be obtained for five cents each, by addressing the "Commissioner of Patents, Washington, D. C."